Nov. 30, 1926.
J. H. CLARK
1,608,722
DRAWBAR ATTACHMENT FOR VEHICLES
Filed Feb. 6, 1923      2 Sheets-Sheet 1
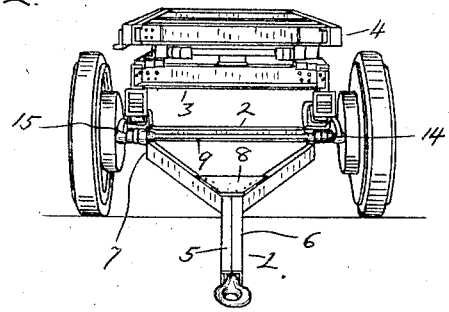
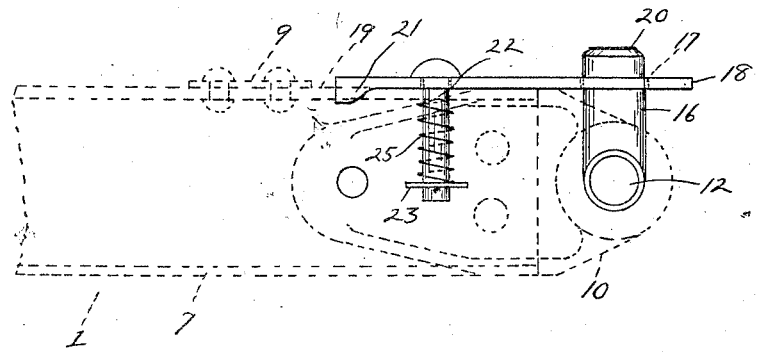
Inventor
James H. Clark Nov. 30, 1926.

J. H. CLARK 1,608,722

DRAWBAR ATTACHMENT FOR VEHICLES

Filed Feb. 6, 1923    2 Sheets-Sheet 2

Inventor
James H. Clark

By Whittemore Hulbert Whittemore Belknap
Attorneys

Patented Nov. 30, 1926.

1,608,722

UNITED STATES PATENT OFFICE.

JAMES H. CLARK, OF RIVER ROUGE, MICHIGAN.

DRAWBAR ATTACHMENT FOR VEHICLES.

Application filed February 6, 1923. Serial No. 617,403.

This invention relates to vehicles and refers more particularly to drawbars therefor.

An object of the invention is to provide a strong and durable drawbar which may be easily and quickly attached to or disconnected from either end of the vehicle according to the direction of travel and which may be used for either pulling or pushing the vehicle.

Another object is to provide simple and effective means for retaining the pivot pin in position when the drawbar is attached to the vehicle.

With the above and other objects in view the invention consists in certain novel features of construction, combination and arrangement of parts as will be more fully described and particularly pointed out in the appended claims.

In the accompanying drawings:

Figure 1 is a front elevation of a trailer having my invention applied thereto;

Figure 3 is a fragmentary elevation thereof.

Figure 2:
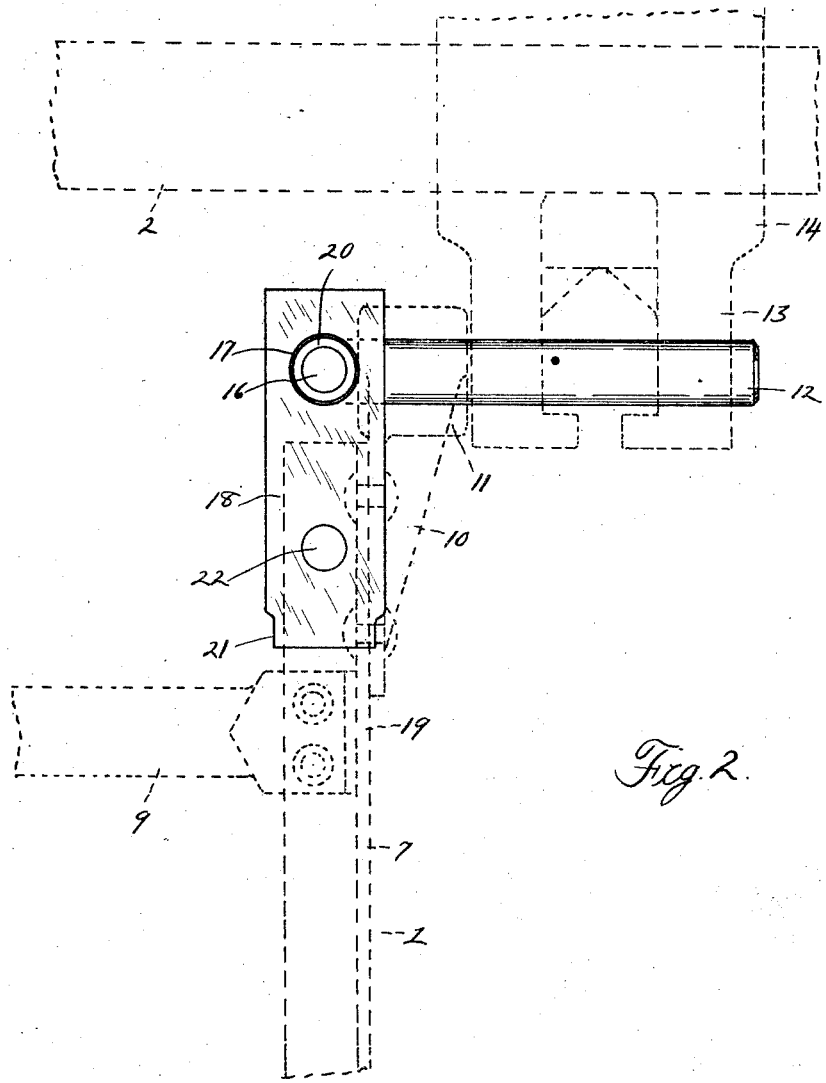
Figure 2 is a fragmentary top plan view thereof.

Referring now to the drawings in which like characters of reference designate corresponding parts throughout the several views, the numeral 1 designates a drawbar which is preferably attached to the front axle 2 or the rear axle 3 of a trailer 4. In detail, the drawbar is preferably Y-shaped and is constructed of two members 5 and 6 respectively which are U-shape in cross-section and which are bent adjacent to their inner ends to provide a pair of parallel arms 7. A plate 8 is secured to the members 5 and 6 intermediate the ends thereof and serves to reinforce the same, while a brace 9 is secured to the arms 7 and serves to retain the said arms in proper spaced relation. Brackets 10 are rigidly secured to the arms 7 at the inner ends thereof and are provided with transversely apertured portions 11 which are adapted to be mounted upon a pair of pivot pins 12.

If it is desired to attach the draw-bar to the forward end of the trailer, the pivot pins 12 may be mounted in spaced parallel horizontal arms 13 of brackets 14 rigidly secured to the front axle, but if it is desired to attach the drawbar to the rear end of the trailer, then the pivot pins 12 may be mounted in the horizontal arms 13 of brackets 15 rigidly secured to the axle 3.

For preventing the pivot pins 12 from working loose when mounted in the arms of either set of brackets upon the axles of the trailer, the pins are preferably bent adjacent to their inner ends to provide vertical fingers 16 which are adapted to engage openings 17 in plates 18 mounted upon the upper flanges 19 of the parallel arms 7 of the drawbar. The upper ends of the fingers 16 are preferably beveled as shown at 20, to assist the fingers into the openings 17 in the plates. Portions of the plates at one end thereof are preferably bent downwardly as shown at 21 so as to engage the sides of the arms 7 and to prevent any lateral displacement of the plates while bolts 22 extend through the plates 18 and through the upper flanges 19 of the arms 7 and are adapted to prevent any movement of the plates longitudinally of the arms. Metallic washers 23 are mounted on the bolts 22 and are detachably retained thereon by means of cotter pins while coil springs 25 surround the bolts 22 between the washers 23 and the upper flanges 19 of the arms 7 and normally retain the plates 18 in engagement with the arms.

In use, the pivot pins 12 may be placed in engagement with or removed from the apertured portions 11 of the brackets 10 and the arms of either of the brackets 14 and 15, and the fingers 16 of the pivot pins may be easily inserted in or withdrawn from the opening 17 in the plates 18 by merely moving the inner ends of the plates vertically.

While it is believed that from the foregoing description, the nature and advantages of the invention will be readily apparent, I desire to have it understood that I do not limit myself to what is herein shown and described and that such changes may be resorted to as fall within the scope of what is claimed.

What I claim as my invention is:

1. The combination with a vehicle having an axle, of a pivot member adapted to be supported from said axle, a drawbar detachably mounted on said pivot member, a plate engaging said drawbar and having an opening therein, yieldable means for normally retaining said plate in engagement with said drawbar, and means carried by said pivot member including a vertical finger adapted to engage the opening in said plate to prevent accidental displacement of said pivot member.

2. The combination with a vehicle having an axle, of a pivot member adapted to be supported from said axle, a drawbar detachably mounted on said pivot member, a member engaging said drawbar and having an opening therein, yieldable means for normally retaining said member in engagement with said drawbar, and a finger carried by said pivoted member adapted to engage the opening in said member to prevent accidental displacement of said pivot member.

3. The combination with a vehicle having an axle, of a pivot member adapted to be supported from said axle, a drawbar detachably mounted on said pivot member, a plate carried by said drawbar and having an opening therein, a member adapted to prevent any movement of said plate longitudinally of said drawbar, yieldable means for normally retaining said plate in engagement with said drawbar, and a finger formed integral with said pivot member and adapted to engage the opening in said plate to prevent acidental displacement of said pivot member.

4. The combination with a vehicle having an axle, of a pivot member adapted to be supported from said axle, a drawbar detachably mounted on said pivot member, a plate carried by said drawbar, a member extending through the plate and provided with yieldable means for normally retaining said plate in engagement with said drawbar, and a finger on said pivot member adapted to engage the plate to prevent accidental displacement of said pivot member.

5. The combination with a vehicle having an axle, of a pivot member adapted to be supported from said axle, a plate carried by said drawbar and having an opening therein, said plate having a portion thereof bent downwardly engaging said drawbar to prevent any movement of the plate longitudinally of said drawbar, a member projecting through said plate and drawbar for normally retaining said plate in engagement with the drawbar, and a finger formed integral with said pivot member and adapted to engage the opening in said plate to prevent accidental displacement of said pivot member.

In testimony whereof I affix my signature.

JAMES H. CLARK.